(12) United States Patent
Boden et al.

(10) Patent No.: US 10,078,591 B2
(45) Date of Patent: Sep. 18, 2018

(54) DATA STORAGE CACHE MANAGEMENT

(71) Applicant: International Business Machines Corporation, Armonk, NY (US)

(72) Inventors: Ian Boden, Eastleigh (GB); Nicolas M. Clayton, Warrington (GB); Lee J. Sanders, Chichester (GB); William J. Scales, Portchester (GB); Barry D. Whyte, Auckland (NL)

(73) Assignee: International Business Machines Corporation, Armonk, NY (US)

( * ) Notice: Subject to any disclaimer, the term of this patent is extended or adjusted under 35 U.S.C. 154(b) by 168 days.

(21) Appl. No.: 15/277,104

(22) Filed: Sep. 27, 2016

(65) Prior Publication Data

US 2018/0089080 A1 Mar. 29, 2018

(51) Int. Cl.
*G06F 12/0888* (2016.01)
*G06F 12/084* (2016.01)
*G06F 12/0866* (2016.01)

(52) U.S. Cl.
CPC ........ *G06F 12/084* (2013.01); *G06F 12/0888* (2013.01); *G06F 12/0866* (2013.01); *G06F 2212/1056* (2013.01)

(58) Field of Classification Search
CPC .................. G06F 12/0866; G06F 12/0888
See application file for complete search history.

(56) References Cited

U.S. PATENT DOCUMENTS

| 5,761,705 | A | * | 6/1998 | DeKoning | G06F 11/1666 711/113 |
|---|---|---|---|---|---|
| 7,698,508 | B2 | | 4/2010 | Rajamony et al. | |
| 8,443,134 | B2 | | 5/2013 | Flynn | |
| 8,706,968 | B2 | | 4/2014 | Flynn | |
| 9,195,603 | B2 | | 11/2015 | Price | |
| 9,235,517 | B2 | | 1/2016 | Anderson et al. | |
| 9,298,636 | B1 | * | 3/2016 | O'Brien, III | ........ G06F 12/0888 |
| 9,665,495 | B2 | * | 5/2017 | Maheshwari | ....... G06F 12/0888 |
| 2010/0274962 | A1 | * | 10/2010 | Mosek | ................ G06F 12/0804 711/113 |

(Continued)

OTHER PUBLICATIONS

Tsai, et al., "Leveraging Data Lifetime for Energy-Aware Last Level Non-Volatile SRAM Caches using Redundant Store Elimination," DAC '14 Proceedings of the 51st Annual Design Automation Conference, pp. 1-6, Jun. 2014.

*Primary Examiner* — Charles Rones
*Assistant Examiner* — Hewy H Li
(74) *Attorney, Agent, or Firm* — Nelson and Nelson; Daniel P. Nelson; Alexis V. Nelson

(57) ABSTRACT

A method of managing a data storage cache, comprising: providing a redundant cache comprising first and second caches associated with first and second storage volumes. One of the first and second storage volumes is an active, and one is a passive volume. A write request is received at one of the volumes. If the write request is received at the passive volume, it is forwarded to the active volume. It is determined whether the active volume is a low latency volume. If it is a low latency volume, it is determined whether data exists in the cache associated with the active volume which overlaps with data contained in the write request. If no data exists in that cache which overlaps with data contained in the write request, the write request is processed straight down to said active volume.

15 Claims, 5 Drawing Sheets

(56) References Cited

U.S. PATENT DOCUMENTS

| | | | |
|---|---|---|---|
| 2014/0143493 A1* | 5/2014 | Loh | G06F 12/0804 |
| | | | 711/122 |
| 2014/0244902 A1* | 8/2014 | Sinnionescu | G06F 12/0893 |
| | | | 711/103 |
| 2015/0169450 A1* | 6/2015 | Traut | G06F 12/0862 |
| | | | 711/142 |
| 2015/0286438 A1* | 10/2015 | Sinnionescu | G06F 12/0866 |
| | | | 711/103 |
| 2017/0185512 A1* | 6/2017 | Small | G06F 12/0802 |

* cited by examiner

DATA STORAGE CACHE MANAGEMENT

BACKGROUND

The present invention relates to data storage cache management and more specifically to managing a cache in a hybrid pool containing storage volumes having different latencies.

Low latency storage arrays provide sub millisecond response times but are expensive. Virtualization systems can intelligently place hot data on the expensive low latency storage array subsystems and cold data on cheaper, higher latency storage array subsystems. Many virtualization systems provide a redundant cache to hide the latency of the slower subsystem, but with software defined storage devices using commodity hardware, the latency added due to replication of the data between the sides of the redundant cache is greater than the latency of writing directly to the low latency storage array subsystem.

Prior art solutions include the use of non-commodity hardware with dedicated low latency links between the redundant caches, or more expensive network technologies such as Infiniband, promoted by the Infiniband Trade Association. Another prior art solution is using only low latency storage and disabling cache in the virtualization system. All of these solutions are expensive.

Further prior art solutions are to manually configure volumes to place hot data on the low latency storage and to disable cache for those specific segments. These are complicated, require constant management and are liable to user error.

SUMMARY

According to an embodiment of the invention, a method for managing a data storage cache, comprises: providing a redundant cache comprising a first cache associated with a first storage volume and a second cache associated with a second storage volume, one of said first and second storage volumes being an active volume and the other of said first and second storage volumes being a passive volume; receiving, at one of said first storage volume or said second storage volume, a request to write data; if said request to write data is received at said passive volume, forwarding said request to write data to said active volume; determining whether said active volume is a low latency volume; responsive to said active volume being a low latency volume, determining whether data exists in the cache associated with said active volume which overlaps with data contained in said write request; and responsive to no data existing in the cache associated with said active volume which overlaps with data contained in said write request, processing said write request straight down to said active volume.

In an embodiment, the method further comprises responsive to data existing in the cache associated with said active volume which overlaps with data contained in said write request, processing said write request using a conventional caching algorithm and accelerating when the data written is destaged.

In an embodiment, the method further comprises, responsive to said active volume not being a low latency volume, processing said write request using a conventional caching algorithm to be destaged at a later time.

In an embodiment, the method further comprises publishing which of said first storage volume or said second storage volume is said active volume.

In an embodiment, where said determination as to whether said active volume is a low latency volume uses information indicating the latency of the volume stored in a volume mapping.

Embodiments of the invention provide apparatus for managing a data storage cache, the apparatus comprising: a first storage volume and a second storage volume, one of said first and second storage volumes being an active volume and the other of said first and second storage volumes being a passive volume; a redundant cache comprising a first cache associated with a first storage volume and a second cache associated with a second storage volume; and a first node associated with said first cache and a second node associated with said second cache, one of said first node or said second node receiving a request to write data, if said request to write data is received at the node associated with said passive volume, forwarding said request to write data to the node associated with said active volume, the node associated with said active volume determining whether said active volume is a low latency volume, responsive to said active volume being a low latency volume, determining whether data exists in the cache associated with said active volume which overlaps with data contained in said write request; and responsive to no data existing in the cache associated with said active volume which overlaps with data contained in said write request, processing said write request straight down to said active volume.

Embodiments of the invention also provide a computer program product for managing a data storage cache, the computer program product comprising: a computer readable storage medium having program instructions embodied therewith, the program instructions executable by a computer to cause the computer to: provide a redundant cache comprising a first cache associated with a first storage volume and a second cache associated with a second storage volume, one of said first and second storage volumes being an active volume and the other of said first and second storage volumes being a passive volume; receive, at one of said first storage volume or said second storage volume, a request to write data; if said request to write data is received at said passive volume, forward said request to write data to said active volume; determine whether said active volume is a low latency volume; responsive to said active volume being a low latency volume, determine whether data exists in the cache associated with said active volume which overlaps with data contained in said write request; and responsive to no data existing in the cache associated with said active volume which overlaps with data contained in said write request, process said write request straight down to said active volume.

BRIEF DESCRIPTION OF THE DRAWINGS

Preferred embodiments of the present invention will now be described in more detail, by way of example only, with reference to the accompanying drawings, in which:

FIG. 2, comprising

DETAILED DESCRIPTION

Figure 1:
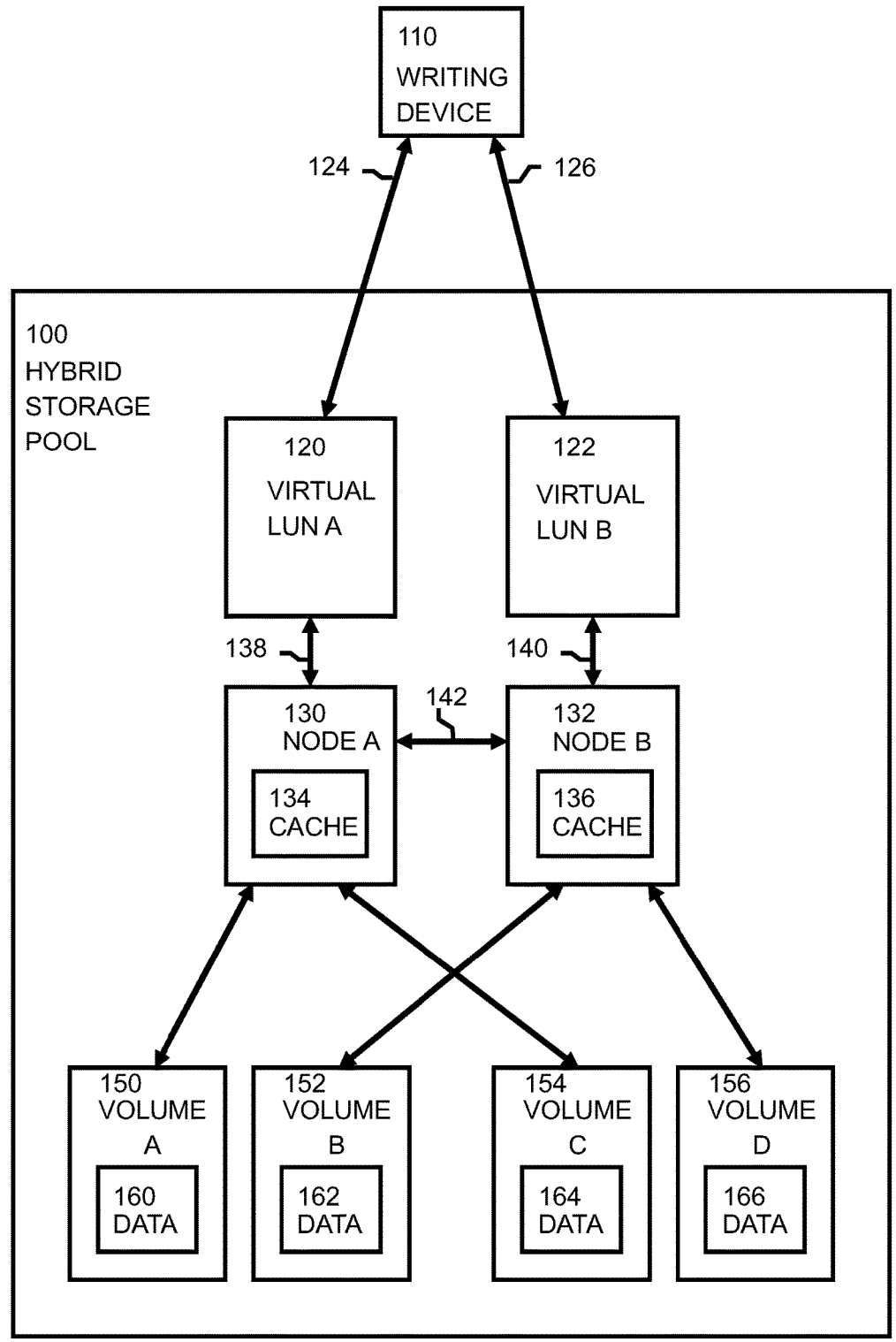
FIG. 1 is a block diagram of a hybrid storage pool for receiving write requests from a writing device in which embodiments of the present invention may be implemented.

FIG. 1 is a block diagram of a hybrid storage pool 100 for receiving write requests 124, 126 from a writing device 110 in which embodiments of the present invention may be implemented. Hybrid storage pool 100 comprises virtual logical unit number (LUN) A 120 and virtual LUN B 122. Hybrid storage pool 100 further comprises a redundant cache made up of a first cache 134 associated with the first virtual LUN A 120 at a first node A 130 and a second cache 136 associated with the second virtual LUN B 122 at a second node B 132. Communication 142 between the nodes 130, 132 allows caches 134, 136 to operate together as a redundant cache. Data written to either of the virtual LUNs 120, 122 is written through caches 134, 136 in nodes 130, 132 to be stored as data 160-166 on volumes 150-156. The data which is written may be later accessed by a reading device (not shown) which makes a read request to virtual LUN A 120 or virtual LUN B 122 which then accesses data 160-166 from volumes 150-156.

A write request 124, 126 may come from writing device 110 through virtual LUN A 120 or virtual LUN B 122 to node A 130 or to node B 132. In embodiments of the invention, there may be one writing device 110 or there may be more than one writing device 110. The write request 124, 126 is an instruction from the writing device 110 to the hybrid storage pool 100 to write data to a location 160-166 in storage 150-156. For example, the write request 124, 126 arrives at virtual LUN A 120. In this example, virtual LUN A 120 may know that the data 160 to be written is located on volume A 150. Virtual LUN A 120 requests node A 130, which is the active node for volume A 150 and volume C 154, to write the data 160 to volume A 150. Node A 130 writes the data to cache 134, which will then be written to volume A 150 at some point in the future. Node A 130 must also replicate the write request to cache 136 in node B 132. Cache 136 in node B 132 is a passive cache for volume A 150. The write request is only completed when this is done, to maintain data consistency in the event of a single node failure. The passive cache 136 forwards on all read requests and all write requests to the active cache 134. If the write request 124, 126 is to write data 164 located on volume C 154, then the same process is followed. If the write request 124, 126 is to data 162 located on volume B 152 or for data 166 located on volume D 156, then it is redirected by node A 130 to node B 132 for writing. In embodiments of the invention, there may be other than two volumes 150-156 associated with each node 130, 132 and there may be different numbers of volumes 150-156 associated with each one of the nodes 130, 132.

A read request for data 160 on volume A 150 is satisfied through node A 130 and cache 134. This is because node A 130 and cache 134 are active for volume A 150, as well as for volume C 154. Similarly for a read request for data 164 on volume C 154. A read request for data 162 on volume B 152 is satisfied through node B 132 and cache 136. This is because node B 132 and cache 136 are active for volume B 152, as well as for volume D 156. All read requests are directed to the active node 130, 132 for any volume 150-156. In the event of failure of the active node 130, 132, the passive node 130, 132 is used.

Figure 2A:
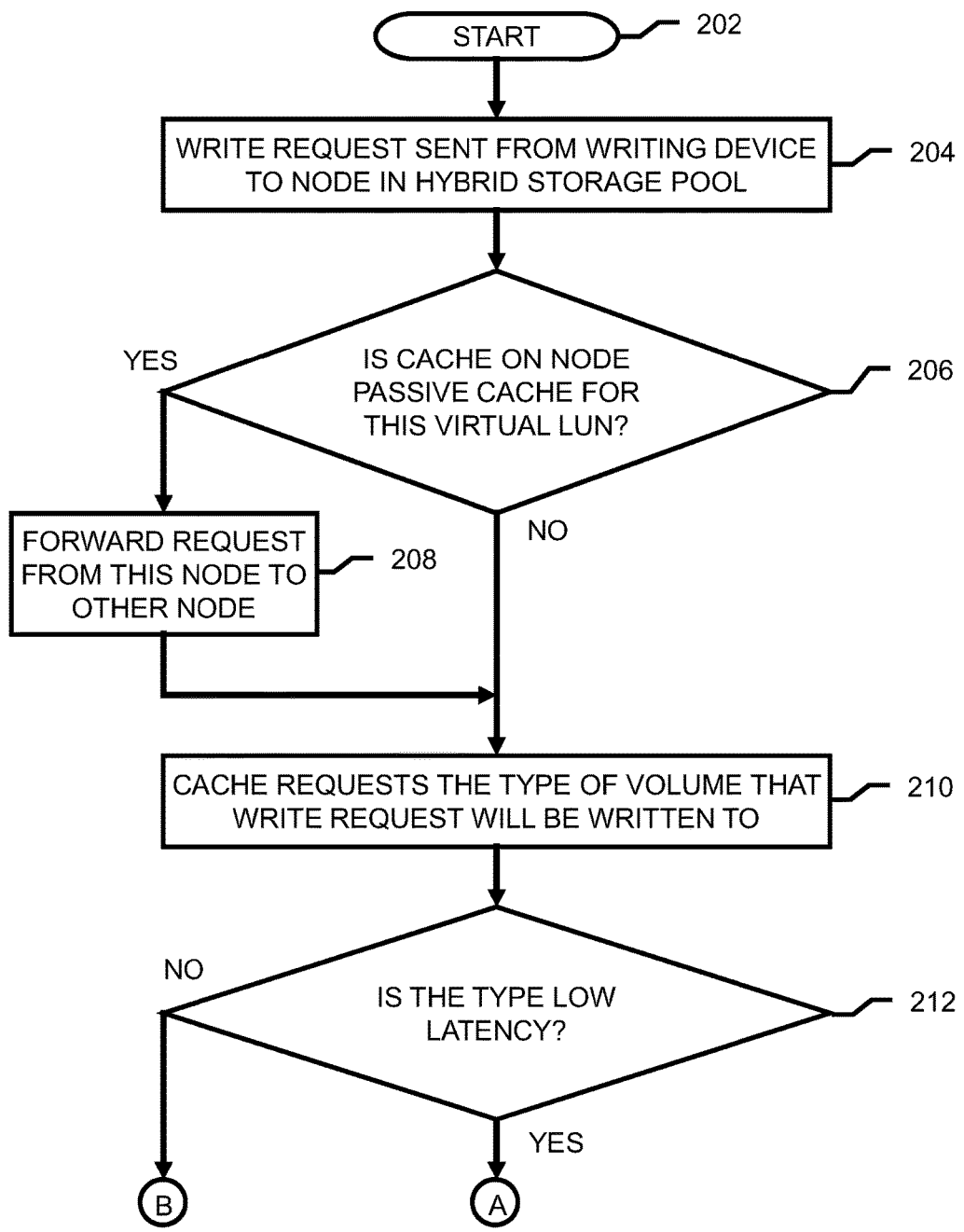
FIGS. 2A and 2B, is a flow chart of an embodiment of a method of managing a data storage cache according to an embodiment of the present invention.
Figure 2B:
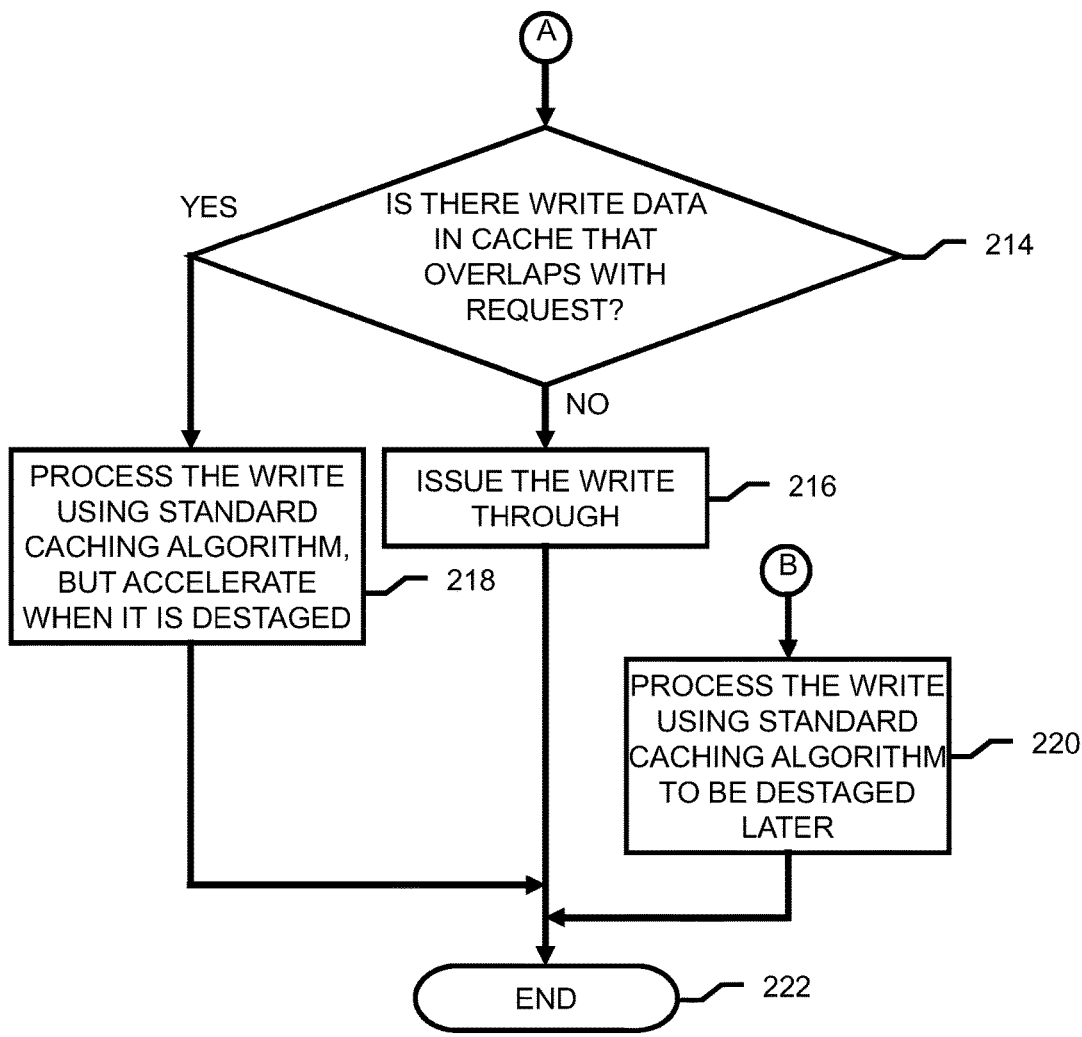

FIG. 2, comprising FIGS. 2A and 2B, is a flow chart of an embodiment of a method of managing a data storage cache according to an embodiment of the present invention. The method starts at step 202. At step 204, a request 124, 126 to write data is received by hybrid storage pool 100 from writing device 110. The write request 124, 126 may be directed at virtual LUN A 120 or virtual LUN B 122.

For the purposes of clarity of the following description of this step, it will be assumed that the write request 124, 126 is directed at virtual LUN A 120. The write request 124, 126 may equally be directed at virtual LUN B 122, in which case references to virtual LUN A 120 and virtual LUN B 122 may be reversed. The write request 124, 126 is passed to node A 130 and its associated cache 134 for execution. At step 206, a check is made by node A 130 as to whether the cache 134 in node A 130 is a passive cache or an active cache for the volume 150-156 to which data 160-166 is to be written. If the cache 134 in node A 130 is an active cache for the volume 150-156 to which data 160-166 is to be written, then processing proceeds to step 210. In FIG. 1, the cache 134 in node A 130 is an active cache for data 160 on volume A 150 and for data 164 on volume C 154. If the cache 134 in node A 130 is a passive cache for the volume 150-156 to which data is to be written, then processing proceeds to step 208. In FIG. 1, the cache 134 in node A 130 is a passive cache for data 162 on volume B 152 and for data 166 on volume D 156.

At step 208, the write request 124-126 is forwarded from node A 130 to node B 132 for processing. In this case, the cache 136 in node B 132 is the active cache for the volume 152, 156 to which data is to be written.

Again, for the purposes of clarity of the following description, it will be assumed that the write request 124-126 has been received by node A 130 and that the cache 134 in node A 130 is the active cache for the volume 150, 154 to which data is to be written. The write request 124, 126 may equally be received by node B 132, in which case references to node A 130 and node B 132 and their respective caches 134, 136 may be reversed. The write request 124, 126 may equally have been received by node B 132 and the cache 136 in node B 132 is the passive cache for the volume 150, 154 to which data is to be written, thus resulting in the write request being forwarded at step 208 from node B 132 which received it, to node A 130.

Further for the purposes of clarity of the following description, it will be assumed that the volume A 150 associated with cache 134 is a conventional (or high) latency storage device and that the volume C 154 associated with cache 134 is a low latency storage device. The latency of these two volumes 150, 154 may be reversed and there may be any number of high latency volumes associated with the cache 134. Similarly, there may be any number, including zero, of low latency volumes associated with the cache 134. Further, the use of the terms low latency and high latency represent relative latencies and indeed in some hybrid storage pools 100 a volume 150-156 with a high latency relative to other low latency volumes 150-156 in that hybrid storage pool 100 may actually have a lower latency than a volume 150-156 in another hybrid storage pool. For example, in a first hybrid storage pool 100 having volumes with latencies of 100 and 10 units of time respectively, the volume with a latency of 100 units of time is a high latency volume and the volume with a latency of 10 units of time is a low latency volume. In a second hybrid storage pool 100 having volumes with latencies of 1 and 0.1 units of time respectively, the volume with a latency of 1 unit of time is a high latency volume and the volume with a latency of 0.1 unit of time is a low latency volume. A low latency volume may even be changed to a high latency volume for a period of time during, for example, software updates to the low latency volume.

At step 210, node A 130 requests the type of volume 150, 154 that the write request will be written to. Which volume 150, 154 is to be written to is determined by the location of where the data 160, 164 to be written on volume 150, 154 is located. In an embodiment of the invention, this determination may be requested from virtual LUN A 120, which may maintain a volume mapping. In another embodiment of the invention, this determination may be requested from a volume mapping stored within the node A 130 itself. At step 212, a check is made as to whether the type of the volume 150, 154 returned at step 210 is a low latency device. Examples of low latency devices include flash memory devices and solid state storage drives. Examples of devices which are not low latency devices include conventional magnetic and optical hard disks, which typical use rotating storage media.

If the check at step 212 determines that the type of the volume 150, 154 returned at step 210 is not a low latency volume 154, but is a higher latency volume 150, then processing proceeds through connector B to step 220 in FIG. 2B. From this point onwards, the method corresponds to a conventional, prior art system of managing the write request 124, 126. At step 220, the write request 124, 126 to volume A 150 is processed using a standard caching algorithm. In a standard caching algorithm, the data is written to the cache 134 in the node A 130 and is then destaged later by copying the data from the cache 134 to volume A 150. The method ends at step 222.

If the check at step 212 determines that the type of the volume 150, 154 returned at step 210 is a low latency volume 154, then processing proceeds through connector A to step 214 in FIG. 2B. At step 214, a check is made as to whether there is data already in the cache 134 that overlaps with the data associated with the write request 124, 126. If there is no data already in the cache 134 that overlaps with the data associated with the write request 124, 126, then processing proceeds to step 216. At step 216, in this situation, no account needs to be taken of the existing data in the cache 134 before proceeding to process the write request 124, 126 to volume C 154. If there is data already in the cache 134 that overlaps with the data associated with the write request 124, 126, then processing proceeds to step 218. At step 218, in this situation, account needs to be taken of the existing data in the cache 134 before proceeding to process the write request as there could already be changes in the cache 134 to the data that have not yet been destaged to the volume C 154. In an embodiment, processing may proceed to step 220 and the write request to volume 150 is processed using a standard caching algorithm.

In another embodiment, instead of proceeding to step 220, then at step 218, as there is data already in the cache 134 that overlaps with the data associated with the write request 124, 126, the data cannot be written directly to volume C 154. This is because the data in the cache 134 that overlaps the data to be written in the write request 124, 126 may be older data that is being updated by the present write request 124, 126. At a future point in time, any portion of the data in the cache 134 that does not overlap with the data associated with the write request 124, 126 needs to be written to the low latency storage, volume C 154. When this is done, there is a risk that the older, overlapping data in the cache 134 may overwrite the newer data associated with the write request 124, 126. The writing of the data associated with the write request is written to the cache 134 using a standard caching algorithm, but accelerated destaging of the data to the low latency storage, volume C 154, is requested. The accelerated destaging of the data in the cache 134 means that it will be written to the low latency storage, volume C 154. The method ends at step 220.

At step 216, as there is no data already in the cache 134 that overlaps with the data associated with the write request, the data is written straight through the cache 134 to volume C 154. Writing the data to the cache 134 and later destaging it to volume C 154 provides no lower latency than if the data is written both to the cache 134 and the volume C 154 at the same time because the write to volume C 154 is to a low latency volume. The method ends at step 222.

Figure 3:
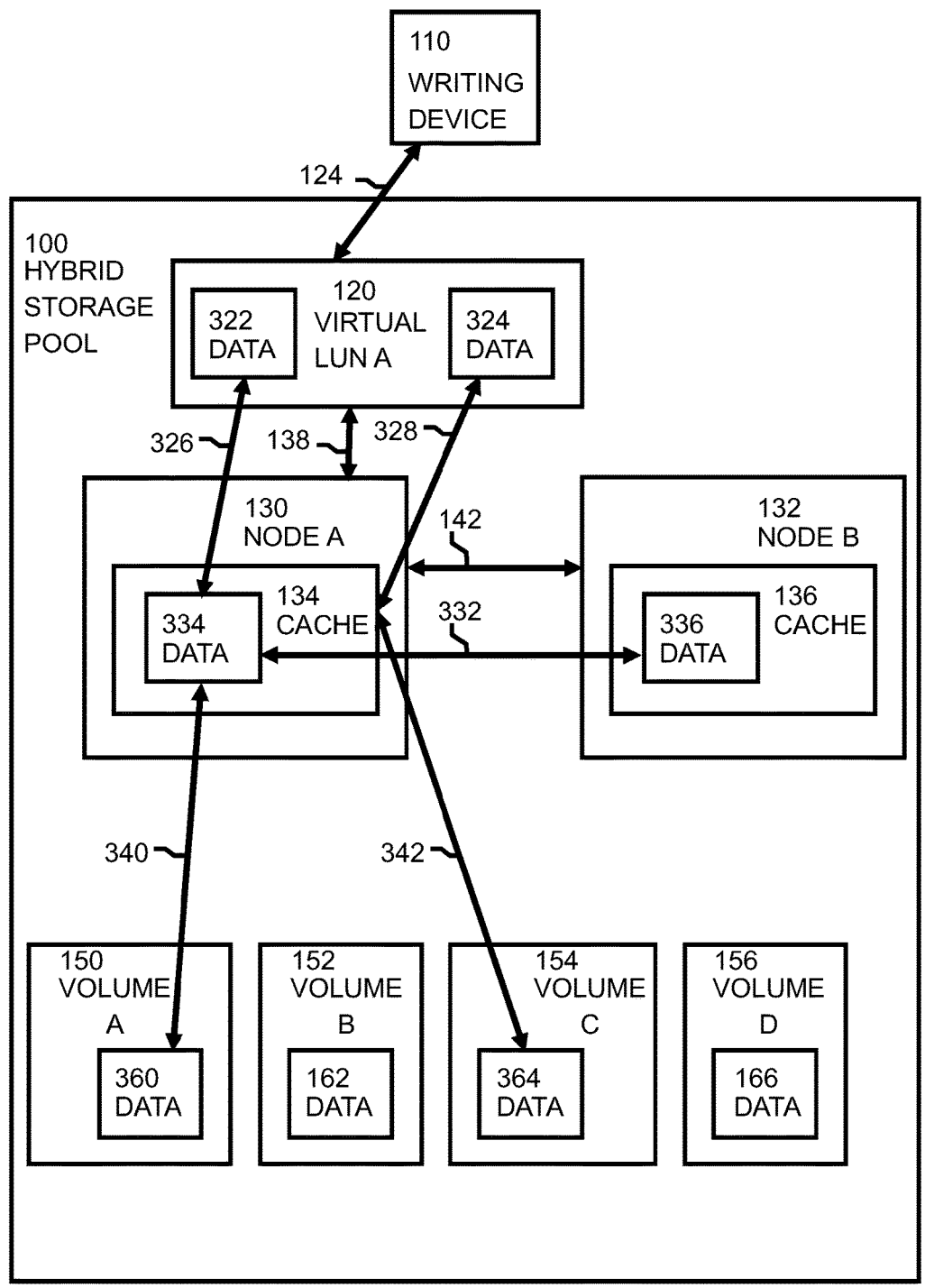
FIG. 3 is a block diagram of a storage array showing data being written to a high latency volume and a low latency volume.

FIG. 3 is a block diagram of a storage array showing first data 322 being written to a high latency volume A 150 and second data 324 being written to a low latency volume C 154. In hybrid storage pool 100, for clarity, only a single virtual LUN A 120 is shown.

Write request 124 to write first data 322 comes from writing device 110 to Virtual LUN A 120. This write request 124 is requesting data 322 to be written. Data 322 is located as data 360 on volume A 150. The cache 134 on node A 130 is an active cache for virtual LUN A 120. Node A 130 requests the type of volume 150 that the write request 124 will be written to. As described above with respect to step 210 of FIG. 2A, in embodiments of the invention, this request may be made to the virtual LUN A 120, which may maintain a volume mapping or it may be made to a volume mapping stored within the node A 130 itself. Is this example, volume A 150 is a high latency volume and so this information is returned to virtual LUN A 120. The write request 124 to volume A 150 is processed using a standard caching algorithm. In the standard caching algorithm, data 322 is written 326 to the cache 134 in the node A 130 where it is stored as data 334. A replication request 332 is sent to the passive node, node B 132, storing a redundant copy of data 334 as data 336 in cache 136 to protect against loss of data in a node failure event. The data is mirrored from cache 134 to cache 136. It is then destaged 340 later by copying the data 334 from the cache 134 to volume A 150 to be stored as data 360.

Write request 124 to write second data 324 comes from writing device 110 to Virtual LUN A 120. This write request 124 is requesting data 324 to be written. Data 324 is located as data 364 on volume C 154. The cache 134 on node A 130 is an active cache for virtual LUN A 120. Node A 130 requests the type of volume C 154 that the write request 124 will be written to. As described above with respect to step 210 of FIG. 2A, in embodiments of the invention, this request may be made to the virtual LUN A 120, which may maintain a volume mapping or it may be made to a volume mapping stored within the node A 130 itself. Is this example, volume C 154 is a low latency volume and so this information is returned to virtual LUN A 120. As the type of volume is a low latency volume, a check is made as to whether there is data already in the cache 134 that overlaps with the data 324 associated with the write request 124. If there is no data already in the cache 134 that overlaps with the data 324 associated with the write request 124, then no account needs to be taken of the existing data in the cache 134 before proceeding to process 328, 342 the write request 124 to volume C 154. The data 324 is written 328, 342 straight through the cache 134 to volume C 154 without being stored as data 334 in the cache. The conventional method of writing the data to the cache 134 and later destaging it to volume C 154 provides no lower latency than if the data is written both to the cache 134 and the volume C 154 at the same time because the write to volume C 154 is to a low latency volume. The method of the present invention of writing 328, 342 straight through the cache 134 to volume C 154 provides a performance advantage as the data does not need to be later destaged from the cache 134, but as volume C 154 is a low latency volume, the writing 328, 342 straight through takes no longer than if the data had been written first to the cache 134.

If there is data already in the cache 134 that overlaps with the data associated with the write request 124, then account needs to be taken of the existing data in the cache 134 before proceeding to process the write request as there could already be changes in the cache 134 to the data that have not yet been destaged to the volume C 154. As there is data already in the cache 134 that overlaps with the data associated with the write request 124, the data cannot be written directly to volume C 154. This is because the data in the cache 134 that overlaps the data to be written in the write request may be older data that is being updated by the present write request. At a future point in time, any portion of the data in the cache 134 that does not overlap with the data associated with the write request needs to be written to the low latency storage, volume C 154. When this is done, there is a risk that the older, overlapping data in the cache 134 may overwrite the newer data associated with the write request. The writing of the data associated with the write request is written to the cache 134 using a standard caching algorithm, but accelerated destaging of the data to the low latency storage, volume C 154, is requested. The accelerated destaging of the data in the cache 134 means that it will be written to the low latency storage, volume C 154. In FIG. 3, with the exception of the accelerated destaging of the data, the processing of data 324 corresponds with what is shown in FIG. 3 for the processing of data 322.

Figure 4:
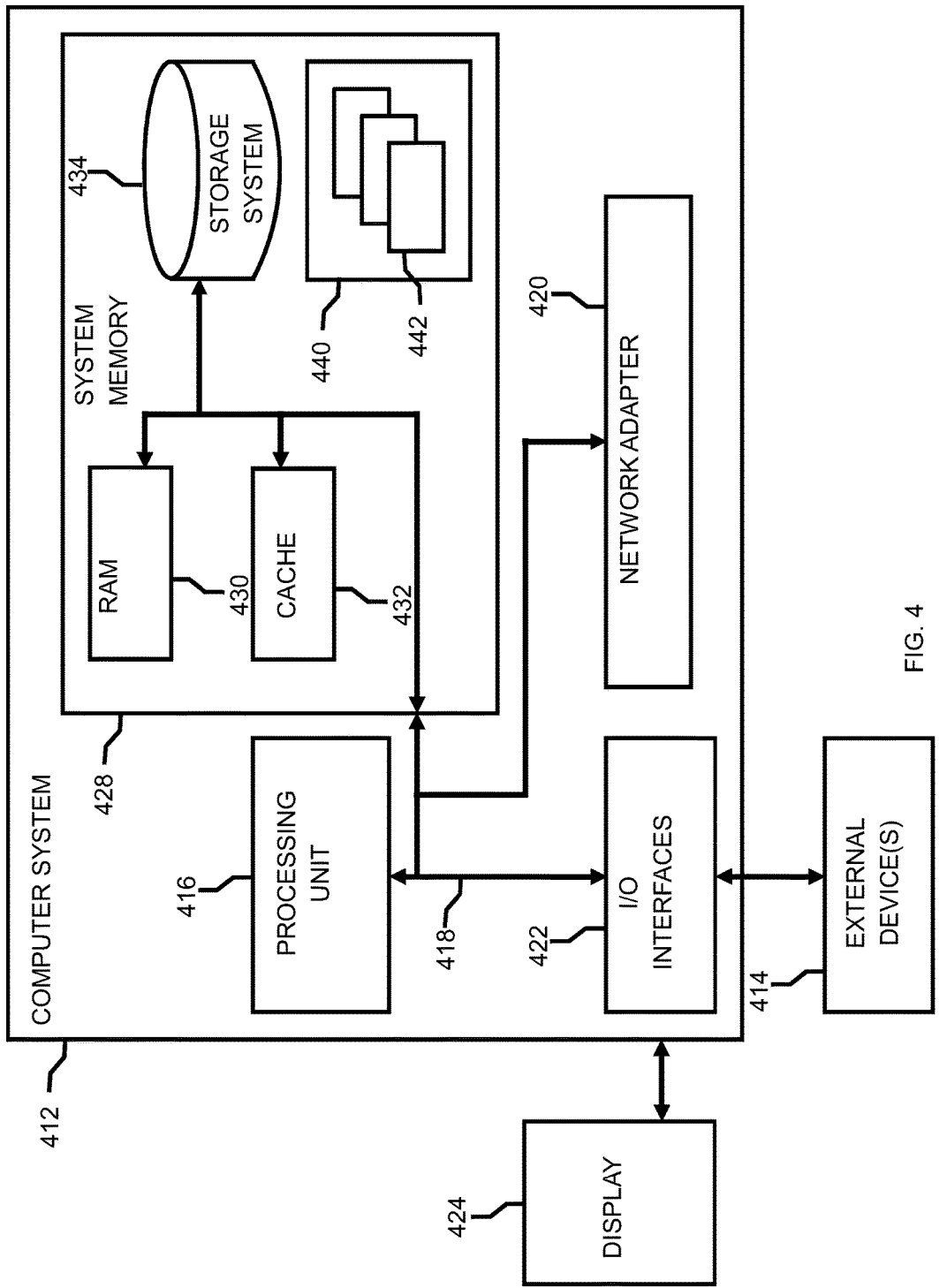
FIG. 4 is a computer system in which embodiments of the present invention may be implemented.

Referring now to FIG. 4, a schematic of an example of computing system is shown. Computing system 412 is only one example of a suitable computing system and is not intended to suggest any limitation as to the scope of use or functionality of embodiments of the invention described herein. Regardless, computing system 412 is capable of being implemented and/or performing any of the functionality set forth hereinabove.

Computer system/server 412 is operational with numerous other general purpose or special purpose computing system environments or configurations. Examples of well-known computing systems, environments, and/or configurations that may be suitable for use with computer system/server 412 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 412 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 412 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 412 is shown in the form of a general-purpose computing device. The components of computer system/server 412 may include, but are not limited to, one or more processors or processing units 416, a system memory 428, and a bus 418 that couples various system components including system memory 428 to processor 416.

Bus 418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 412 typically includes a variety of computer system readable media. Such media may be any available media that is accessible by computer system/server 412, and it includes both volatile and non-volatile media, removable and non-removable media.

System memory 428 can include computer system readable media in the form of volatile memory, such as random access memory (RAM) 430 and/or cache memory 432. Computer system/server 412 may further include other removable/non-removable, volatile/non-volatile computer system storage media. By way of example only, storage system 434 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 418 by one or more data media interfaces. As will be further depicted and described below, memory 428 may include at least one program product having a set (e.g., at least one) of program modules that are configured to carry out the functions of embodiments of the invention.

Program/utility 440, having a set (at least one) of program modules 442, may be stored in memory 428 by way of example, and not limitation, as well as an operating system, one or more application programs, other program modules, and program data. Each of the operating system, one or more application programs, other program modules, and program data or some combination thereof, may include an implementation of a networking environment. Program modules 442 generally carry out the functions and/or methodologies of embodiments of the invention as described herein.

Computer system/server 412 may also communicate with one or more external devices 414 such as a keyboard, a pointing device, a display 424, etc.; one or more devices that enable a user to interact with computer system/server 412; and/or any devices (e.g., network card, modem, etc.) that enable computer system/server 412 to communicate with one or more other computing devices. Such communication can occur via Input/Output (I/O) interfaces 422. Still yet, computer system/server 412 can communicate with one or more networks such as a local area network (LAN), a general wide area network (WAN), and/or a public network (e.g., the Internet) via network adapter 420. As depicted, network adapter 420 communicates with the other components of computer system/server 412 via bus 418. It should be understood that although not shown, other hardware and/or software components could be used in conjunction with computer system/server 412. Examples, include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, column-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method of managing a data storage cache, comprising:
   providing a redundant cache comprising a first cache associated with a first storage volume and a second cache associated with a second storage volume, one of said first and second storage volumes being an active volume and the other of said first and second storage volumes being a passive volume;
   receiving, at one of said first storage volume or said second storage volume, a request to write data;
   if said request to write data is received at said passive volume, forwarding said request to write data to said active volume;
   determining whether said active volume is a low latency volume;
   responsive to said active volume being a low latency volume, determining whether data exists in the cache associated with said active volume which overlaps with data contained in said write request; and
   responsive to no data existing in the cache associated with said active volume which overlaps with data contained in said write request, processing said write request straight down to said active volume.

2. The method of claim 1, further comprising, responsive to data existing in the cache associated with said active volume which overlaps with data contained in said write request, processing said write request using a conventional caching algorithm and accelerating when the data written is destaged.

3. The method of claim 1, further comprising, responsive to said active volume not being a low latency volume, processing said write request using a conventional caching algorithm to be destaged at a later time.

4. The method of claim 1, further comprising publishing which of said first storage volume or said second storage volume is said active volume.

5. The method of claim 1, where said determination as to whether said active volume is a low latency volume uses information indicating the latency of the volume stored in a volume mapping.

6. An apparatus for managing a data storage cache, the apparatus comprising:
   a first storage volume and a second storage volume, one of said first and second storage volumes being an active volume and the other of said first and second storage volumes being a passive volume;
   a redundant cache comprising a first cache associated with a first storage volume and a second cache associated with a second storage volume; and
   a first node associated with said first cache and a second node associated with said second cache, one of said first node or said second node receiving a request to write data, if said request to write data is received at the node associated with said passive volume, forwarding said request to write data to the node associated with said active volume, the node associated with said active volume determining whether said active volume is a low latency volume, responsive to said active volume being a low latency volume, determining whether data exists in the cache associated with said active volume which overlaps with data contained in said write request; and responsive to no data existing in the cache associated with said active volume which overlaps with data contained in said write request, processing said write request straight down to said active volume.

7. The apparatus of claim 6, wherein the node associated with said active volume, responsive to data existing in the cache associated with said active volume which overlaps with data contained in said write request, processing said write request using a conventional caching algorithm and accelerating when the data written is destaged.

8. The apparatus of claim 6, wherein the node associated with said active volume, responsive to said active volume not being a low latency volume, processing said write request using a conventional caching algorithm to be destaged at a later time.

9. The apparatus of claim 6, wherein the node associated with said active volume publishes which of said first storage volume or said second storage volume is said active volume.

10. The apparatus of claim 6, wherein the node associated with said active volume uses information indicating the latency of the volume stored in a volume mapping in determining whether said active volume is a low latency volume.

11. A computer program product for managing a data storage cache, the computer program product comprising:
    a computer readable storage medium having program instructions embodied therewith, the program instructions executable by a computer to cause the computer to:
      provide a redundant cache comprising a first cache associated with a first storage volume and a second cache associated with a second storage volume, one of said first and second storage volumes being an active volume and the other of said first and second storage volumes being a passive volume;
      receive, at one of said first storage volume or said second storage volume, a request to write data;
      if said request to write data is received at said passive volume, forward said request to write data to said active volume;
      determine whether said active volume is a low latency volume;
      responsive to said active volume being a low latency volume, determine whether data exists in the cache associated with said active volume which overlaps with data contained in said write request; and
      responsive to no data existing in the cache associated with said active volume which overlaps with data contained in said write request, process said write request straight down to said active volume.

12. The computer program product of claim 11, further comprising, responsive to data existing in the cache associated with said active volume which overlaps with data contained in said write request, processing said write request using a conventional caching algorithm and accelerating when the data written is destaged.

13. The computer program product of claim 11, further comprising, responsive to said active volume not being a low latency volume, processing said write request using a conventional caching algorithm to be destaged at a later time.

14. The computer program product of claim 11, further comprising publishing which of said first storage volume or said second storage volume is said active volume.

15. The computer program product of claim 11, where said determination as to whether said active volume is a low latency volume uses information indicating the latency of the volume stored in a volume mapping.

* * * * *